(No Model.) 2 Sheets—Sheet 1.
W. T. STERLING.
HARROW.
No. 427,276. Patented May 6, 1890.
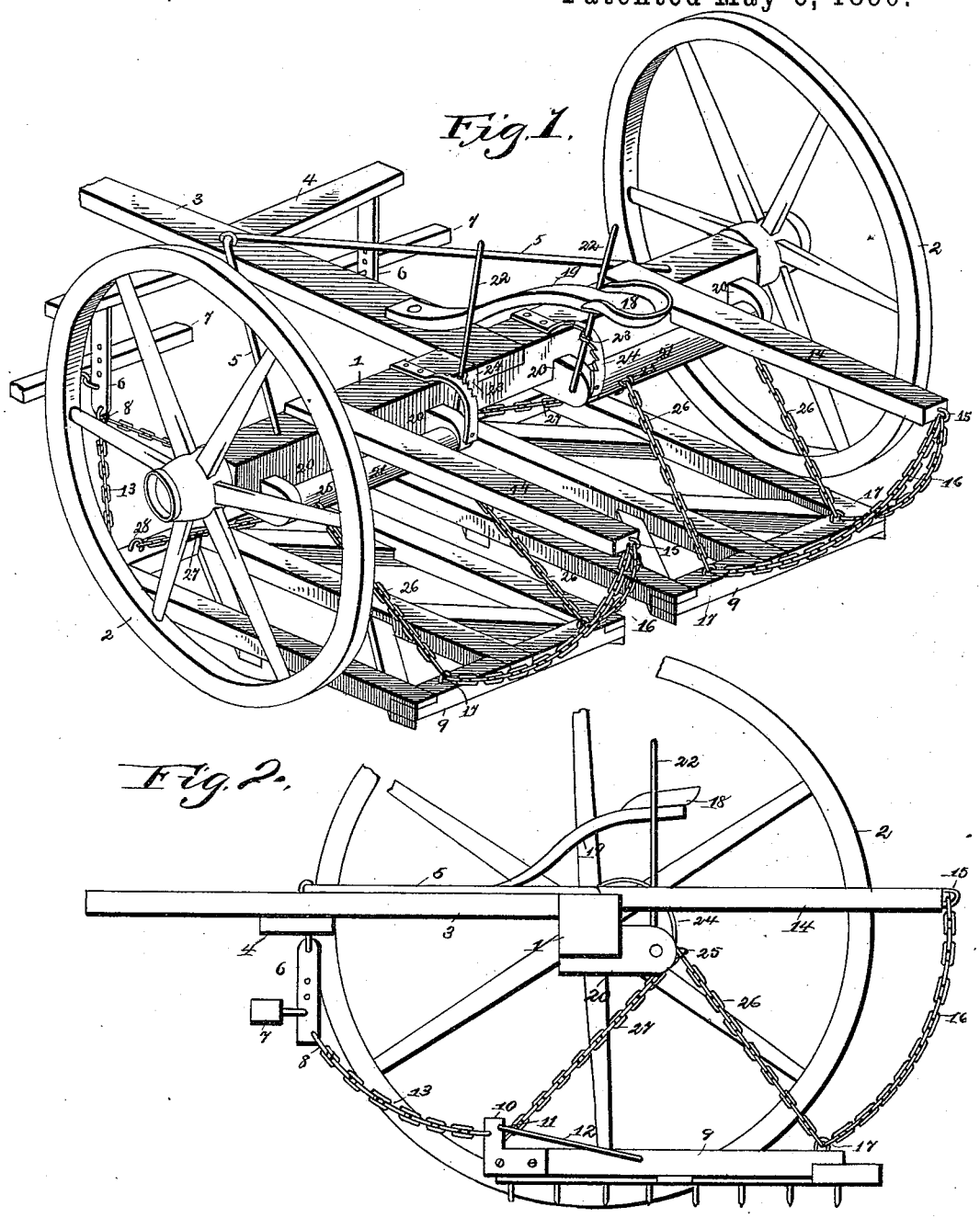
Witnesses  
Inventor  
By his Attorneys, Wm T Sterling (No Model.) 2 Sheets—Sheet 2.

W. T. STERLING.
HARROW.

No. 427,276. Patented May 6, 1890.

Witnesses: Inventor
Wm. T. Sterling
By his Attorneys,

UNITED STATES PATENT OFFICE.

WILLIAM T. STERLING, OF ENTERPRISE, OREGON.

HARROW.

SPECIFICATION forming part of Letters Patent No. 427,276, dated May 6, 1890.

Application filed August 29, 1889. Serial No. 322,299. (No model.)

*To all whom it may concern:*

Be it known that I, WILLIAM T. STERLING, a citizen of the United States, residing at Enterprise, in the county of Wallowa and State of Oregon, have invented a new and useful Harrow, of which the following is a specification.

This invention has relation to harrows; and among the objects in view are to provide a harrow-sulky having depending therefrom by suitable chain-connections a series of independent adjustable harrow-frames; means for operating the same, and so arranged that the line of draft shall be directly upon the harrow, thus relieving the frame of the sulky and the horses; to construct the connections between the harrows and the sulky in such a manner that an even suspension is secured, and to provide an adjusting mechanism under the control of the driver, whereby either one or both harrows may be raised or lowered to pass over dead-furrows, stones, stumps, mounds, &c.

Other objects and advantages of the invention will hereinafter appear, and the novel features thereof will be particularly pointed out in the claims.

Figure 3:
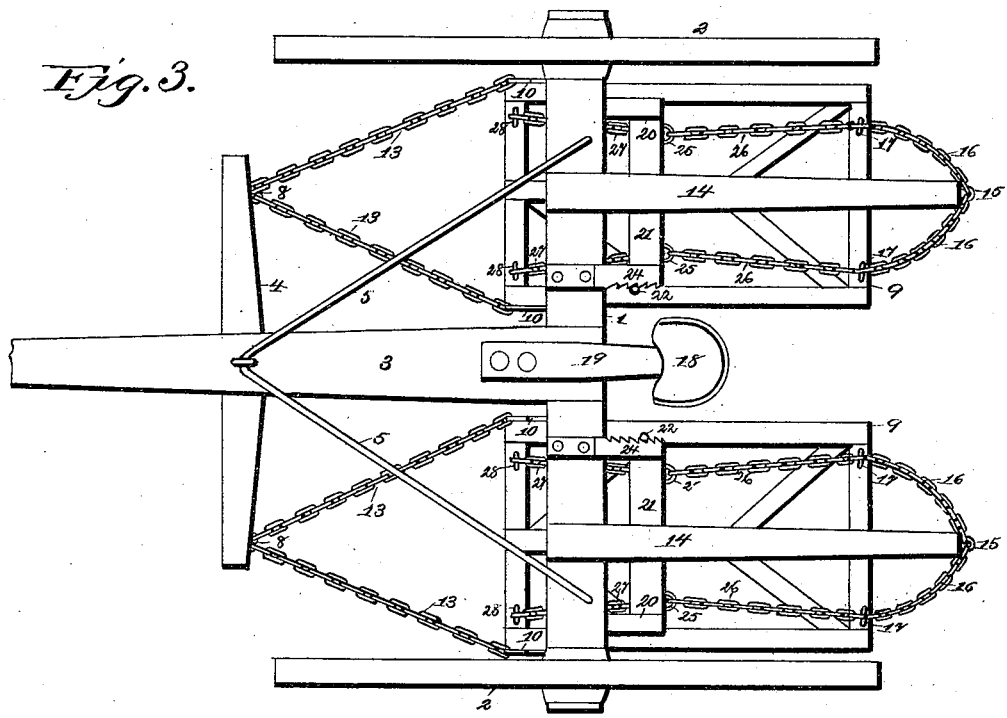
Figure 4:
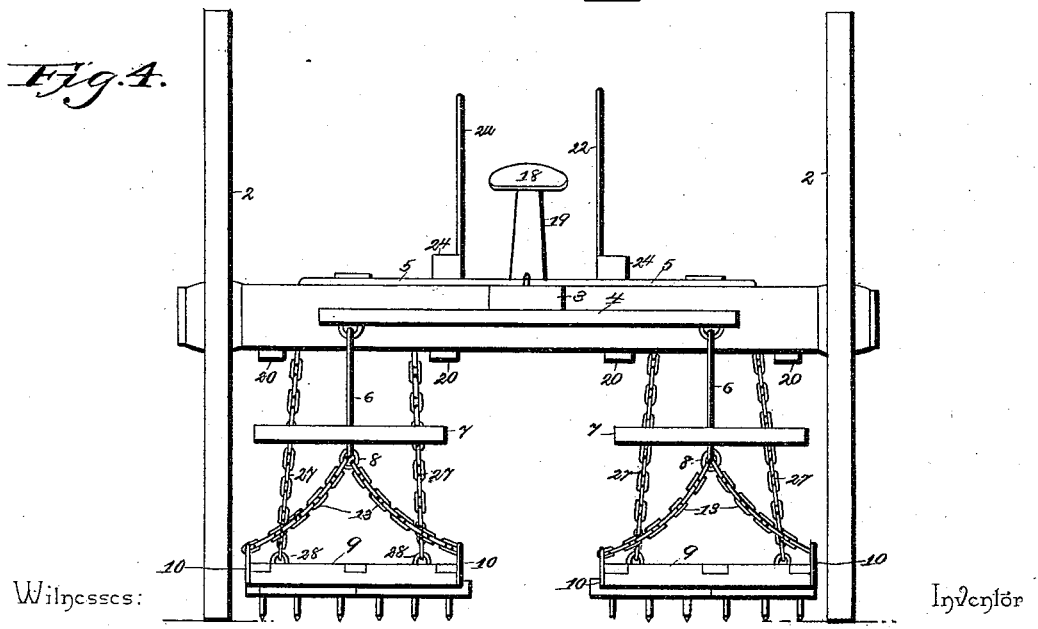

Referring to the drawings, Figure 1 is a rear perspective of a harrow constructed in accordance with my invention; Fig. 2, a side elevation, one of the supporting-wheels being removed; Fig. 3, a plan, and Fig. 4 a front elevation.

Like numerals of reference indicate like parts in all the figures of the drawings.

1 represents the axle of the sulky, provided at its opposite ends with the usual wheels 2 and at its center with the forwardly-extending draft-bar 3, carrying the cross-tree 4, and braced from the axle by opposite hounds 5. Depending from each end of the cross-piece 4 are perforated draft-links 6, and swiveled in each link, in one of the perforations, is a whiffletree 7, and depending from each of the draft-links is a connecting-link 8.

9 designates a harrow-frame, and in this instance I employ two, each entirely independent of the other and of any ordinary construction, and preferably of that class known as the "butterfly-harrow," comprising a rectangular frame, a central longitudinal bar connecting the ends of the same, and a series of angularly-disposed rearwardly-extending tooth-supporting bars.

At each side of each of the frames 9 and secured to the side bars of said frames at their forward ends, are L-shaped coupling-plates 10, the shank of the L being bolted to said side bars, and the L portion projecting upwardly at a right angle therefrom. The L portion is provided with opposite pairs of openings 11, and from the rear pair of openings of each harrow there extends an inclined brace 12, the opposite end of which terminates in a harrow-frame at about the center of the side bars. In each front pair of openings there is coupled the rear end of an ordinary link-chain 13, the forward ends of which couple with the coupling-links depending from the draft-links 6. These chains form the draft medium between the independent harrow-frames and the draft-links, and it will thus be seen that the line of draft extends directly from the harrows to the whiffletrees.

Intermediate the draft-bar 3 and each of the wheels 2 there extends from the axle 1 an arm 14, provided at its rear extremity with an eye 15, to which is connected the upper ends of a pair of rear draft-chains 16, the lower ends of said chains being connected to the two rear ends of their respective harrow-frames by means of staples or eyes 17, mounted at the corner of the frame. By this arrangement it is apparent that the harrows are maintained in line with the sulky in turning and in proper relation with each other, and that should the team become unruly and back, or should it become necessary, as is often the case, to back the team, such a movement of the sulky will cause the rear draft-chains to rise and draw to the rear the harrow-frames equally as well as the same would move in a forward direction.

I have now described my means for supporting and dragging the harrow-frames, and I will proceed to describe the mechanism by which each frame is made independently adjustable and may be elevated or lowered at will by the driver, the seat for whom is designated by 18, and is mounted upon a seat-bar 19, extending upwardly in an inclined manner from the draft-bar 3, said seat being adjustable upon the bar by any ordinary means. Projecting from the rear axle 1, at each side of the seat, is a pair of bearing-lugs 20, in which are journaled drums 21, the inner ends of each drum being provided with an upwardly-projecting handle 22, having a spring-ratchet 23, adapted to lock with a segmental rack 24, which projects from the axle to one of the lugs, said handles being arranged at both sides of the driver's seat and within easy reach therefrom. Each of the drums 21 is provided with a pair of eyes or staples 25, and to each staple is connected the upper ends of a pair of chains 26 and 27. The chain 27 of each pair extends forward and connects in an eye 28, projecting upwardly from the front bar of the harrow-frame, and the chain 27 projects rearwardly and connects with the staple to which the lower ends of the draft-chain are connected. By this construction it will be apparent that the driver may raise and lower either one or both of the harrow-frames for any purpose whatever.

I am aware of the patents to Harris and Bowne, No. 179,915, and Hannam, No. 276,763, and do not claim the construction shown therein. One point of difference resides in the attachment of all the four chains of each harrow-frame to a single drum; also, the draft-connections between the whiffletrees and the front ends of the harrow-frame are a novel feature.

Having thus described my invention, what I claim is—

1. In a harrow, an axle having a draft-bar carrying a cross-bar, in combination with harrow-frames having L-shaped castings at their sides and rearwardly-projecting inclined brace-rods connecting the casting with the frame, and opposite converging chains terminating in a link, and draft-links depending from the cross-bar and carrying whiffletrees and connected with the links, substantially as specified.

2. In a harrow, an axle provided with an opposite pair of rearwardly-extending bearing-lugs, each provided with a drum and with handles for operating the drum, projecting upwardly, and each provided with a ratchet-bar for locking the handles, in combination with the independent harrow-frames and opposite pairs of supporting-chains leading from the front and rear ends of said frames and connected with their respective drums, substantially as specified.

In testimony that I claim the foregoing as my own I have hereto affixed my signature in presence of two witnesses.

WILLIAM T. STERLING.

Witnesses:
W. C. COMBS,
D. W. SHEAHAN.